United States Patent [19]

Navarro

[11] Patent Number: 4,722,238

[45] Date of Patent: Feb. 2, 1988

[54] RACK AND PINION GEAR

[76] Inventor: Bernard J. Navarro, 4212 Chevy Chase Dr., Glendale, Calif. 90039

[21] Appl. No.: 796,746

[22] Filed: Nov. 12, 1985

Related U.S. Application Data

[60] Division of Ser. No. 724,797, Apr. 19, 1985, Pat. No. 4,588,336, which is a continuation of Ser. No. 472,353, Mar. 4, 1983, abandoned.

[51] Int. Cl.$^4$ .............................................. F16H 1/04
[52] U.S. Cl. .......................................... 74/422; 74/462
[58] Field of Search ................. 74/410, 422, 457, 458, 74/462, 438, 498, 665 GD, 715

[56] References Cited

U.S. PATENT DOCUMENTS

| 2,095,491 | 10/1937 | Beare | 74/462 X |
| 2,638,011 | 5/1953 | Smith | 74/462 |
| 3,229,541 | 1/1966 | Wildhaber | 74/462 X |
| 3,513,587 | 5/1970 | Fischer | 74/422 X |
| 4,218,933 | 8/1980 | Allen et al. | 74/422 |
| 4,222,282 | 9/1980 | Taig | 74/422 X |
| 4,581,952 | 4/1986 | Yabe | 74/422 X |

OTHER PUBLICATIONS

Machinery's Handbook, 15th Edition, by The Industrial Press, published 1954, pp. 62, 63, 650 and 651.

Primary Examiner—Z. R. Bilinsky
Attorney, Agent, or Firm—Warren T. Jessup

[57] ABSTRACT

A rack and pinion gear having helical teeth. A conical hob is employed for cutting recessed rack teeth in the work piece by continuously engaging the hob and work piece as the work piece moves longitudinally beneath (or with respect to) the rotating hob. To mate with the helical teeth in the rack, a helical gear having rounded or arcuate teeth is provided.

5 Claims, 9 Drawing Figures

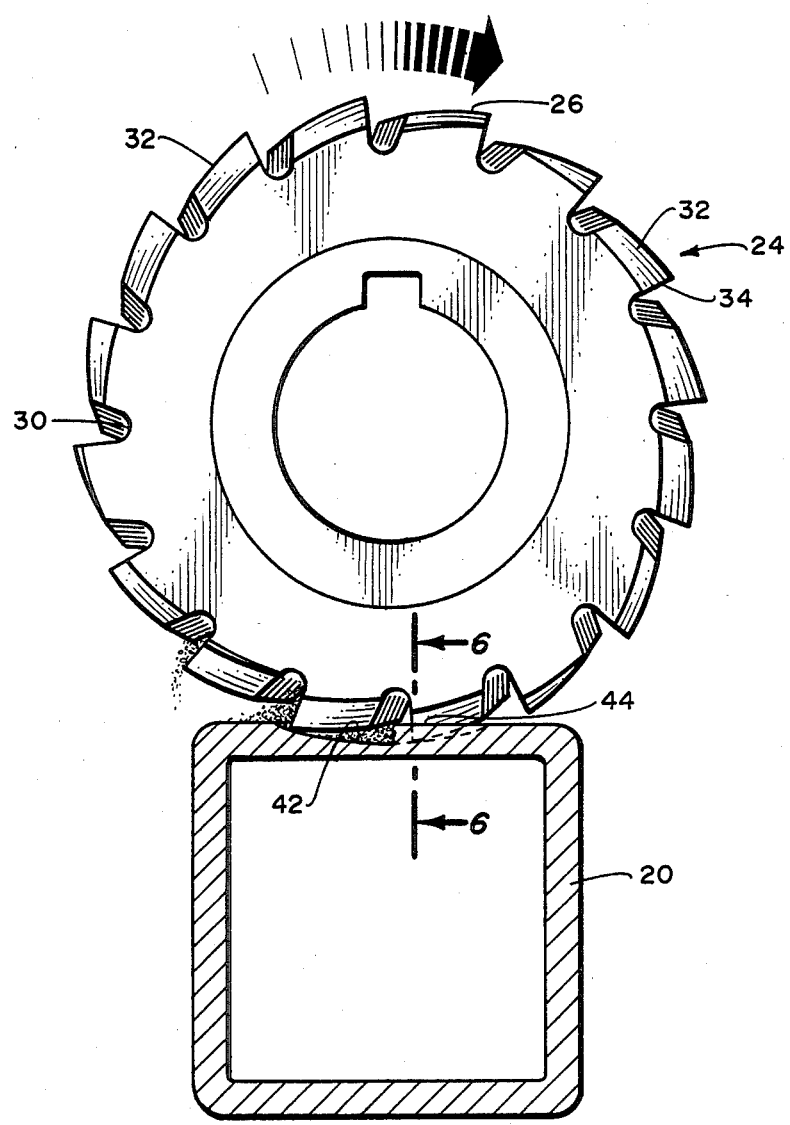
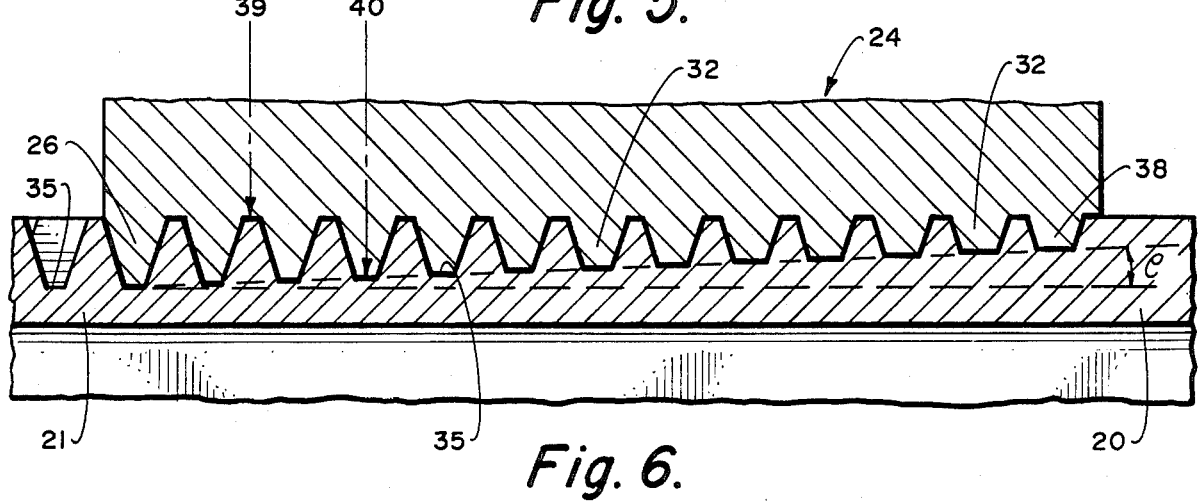

RACK AND PINION GEAR

This is a division of Ser. No. 06/724,797, filed Apr. 19, 1985, U.S. Pat. No. 4,588,336 in turn a continuation of Ser. No. 472,353, filed Mar. 4, 1983.

BACKGROUND OF THE INVENTION

It is known in the art to make a rack with recessed teeth having arcuate roots which mate with a pinion gear having arcuate teeth. To the best of applicant's knowledge, such rack and pinion gear arrangement has never been made with helical teeth. Helical teeth have an advantage that tooth engagement as the gear rotates is modulated over the length of the tooth, obviating the shock of engagement experienced by non-helical teeth. Also, in the prior fabrication of such a rack, the practice has been to: bring a disk cutter, or a set of cutters, into engagement with the work piece; cut a tooth or group of teeth by steadily lowering the cutter against the work piece; separate the cutter and work piece; move the work piece longitudinally; and then cut another groove or tooth. This is a slow process, and precise uniformity of tooth width depends on the skill of the machinist. Also, it could not be used to cut helical rack teeth. While the cutter could be skewed slightly, and the gooves/teeth might appear to be helical, they would in fact be merely arcuate teeth skewed with respect to a perpendicular, and would not mate with a helical pinion gear. The present invention teaches a process and tooling for continuously cutting such recessed helical rack teeth.

Cylindrical hobs have been used to cut gear teeth. The gear blank is engaged by the hob and rotated in synchronism therewith. However, this cannot be done to make a rack, because of the straight configuration of the rack work piece.

SUMMARY OF THE INVENTION

In accordance with the present invention, a conical hob is provided with cutting teeth aligned on one or more helices surrounding the cone. The hob is rotated, and the elongate work piece which is to become the rack is moved longitudinally parallel to the axis of the hob. The smaller end of the hob is first engaged by the work piece, starting the cut of a groove and forming a rack tooth. As the work piece continues to move longitudinally, the larger end of the hob progressively engages a given groove, until finally the groove emerges from under the hob, with the groove having its final depth corresponding to the larger diameter of the conical hob.

When the axis of the rack parallels the axis of the hob, the teeth in the rack come out helical, with a helix angle the same as that of the hob. The rack then mates with a helical pinion gear of the same helix angle as that of the rack. Since fabrication of the rack produces teeth whose roots are arcuately recessed, rather than extending all the way transversely across the face of the rack, the teeth of the mating helical gear are also arcuate.

FIGURES

FIG. 5 is a cross section taken on line 5—5 in FIG. 4.

FIG. 6 is a fragmentary section taken along line 6—6 in FIG. 5.

THE PREFERRED EMBODIMENT

Figure 1:
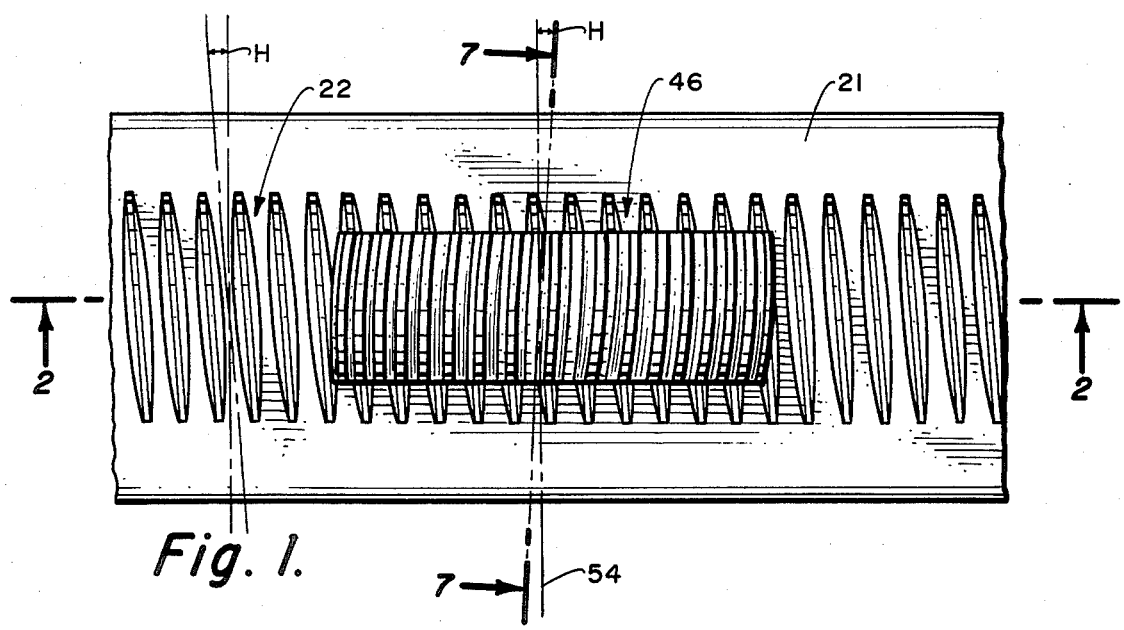
FIG. 1 is a top view of a rack made in accordance with the present invention and having helical teeth. A helical gear is shown in engagement with the rack.
Figure 2:
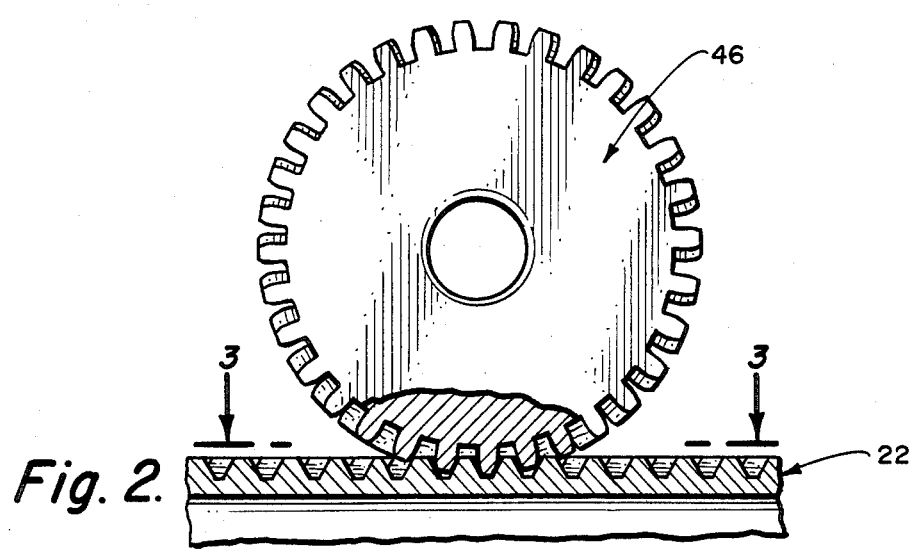
FIG. 2 is a section along line 2—2 in FIG. 1.

In the drawings, 20 (FIGS. 4 and 5) is an elongate, boxlike work piece, in the top surface of which the rack teeth are cut to transform the work piece 20 into a rack 21. In the embodiment shown, the rack teeth ar helical; that is, while the teeth 22 are generally transverse to the longitudingl axis of the rack 21, they are skewed slightly by the helix angle H of the teeth (FIG. 1).

Figure 4:
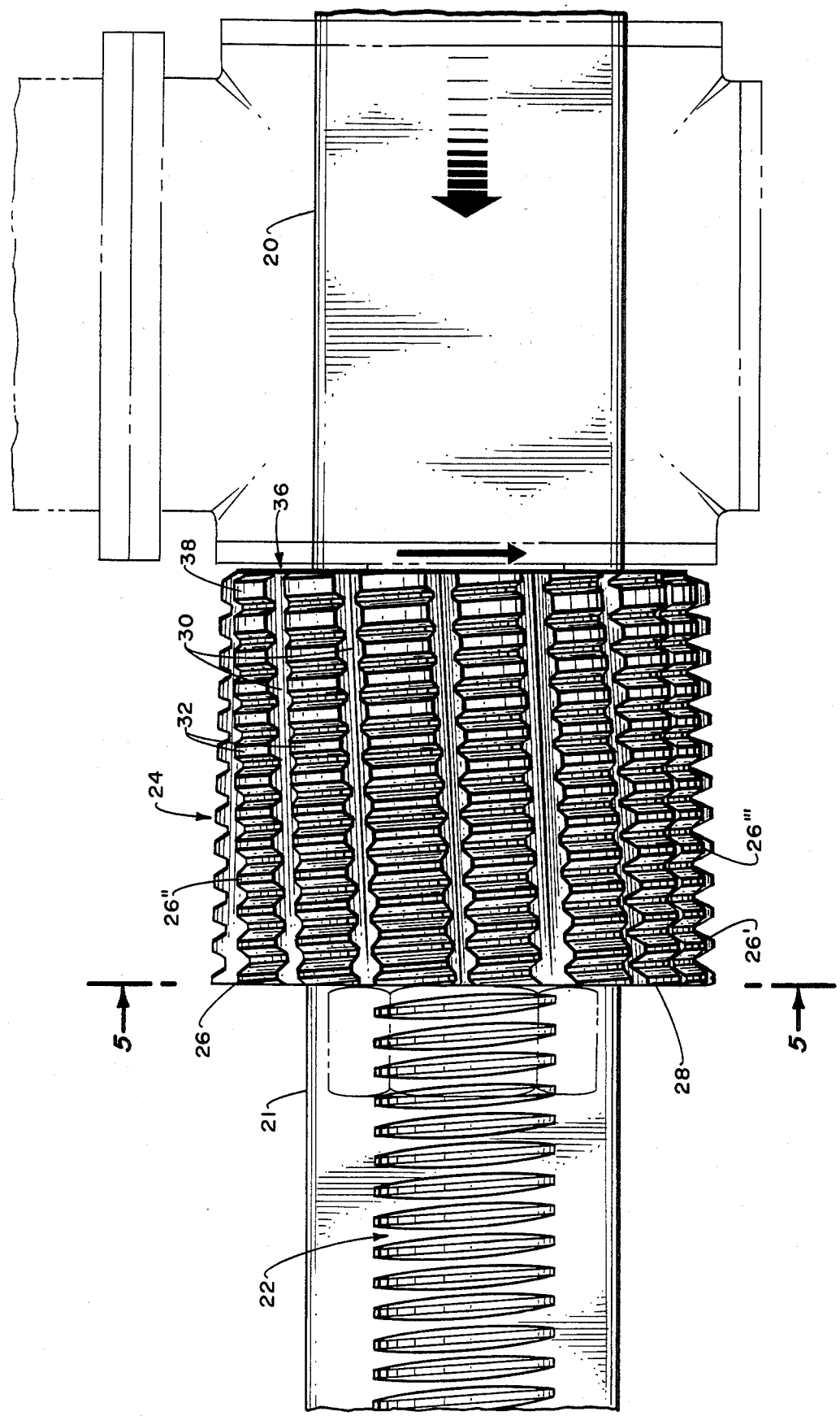
FIG. 4 is a top view showing a conical hob in process of cutting the rack shown in FIG. 1.

The teeth 22 in the rack 21 are made by cutting the top surface of the work piece 20 with a conical hob 24, having at least one helical ridge circumferentially and axially surrounding the conical face of the hob 24. In the particular embodiment shown, the hob 24 has a triple thread in order to attain the desired helix angle in the end product. That is, a given thread or ridge starts at 26 (FIG. 4). One hundred twenty degrees around the circumference of the hob, starts a second thread or ridge 28, and another one hundred twenty degrees aroung starts the third ridge (not shown). The first ridge starts at the large end of the cone at 26, continues to 26', then around the hob to 26'', thence to 26''', and so on.

It is to be understood that, if desired, the hob may be made with only a single helix, in which case the helix angle would be smaller. In similar vein, a dual thread or ridge could be employed, in which case, as one moves along the face of the cone longitudinally, there would be a pair of interleaved ridges.

The hob 24 is provided with a plurality of flutes or gashes 30 passing through the helical ridges 26, 28. The flutes are generally parallel to the axis of the hob 24, but are skewed slightly in accordance with conventional practice in order to minimize the shock on the system as the teeth of the hob engage the work piece.

The flutes 30 form cutting teeth 32 around the hob ridges or threads. The leading edge 34 of each tooth 32 constitutes the cutting edges of the hob which engage the work piece 20, to cut the grooves 35 that form the teeth of the rack. As in a conventional hob, the flutes 30 collect the flakes or chips that are cut from the work piece 20.

To form the teeth, the hob 24 is rotatably mounted and positioned at one end of the work piece 20. The small end 36 of the cone 24 faces the advancing work piece 20. The work piece 20 is moved longitudinally into engagement with the rotating hob 24, so that the smaller end of the conical hob first engages the surface of the work piece 20, and the teeth 38 at the small end of the hob begin to cut a given groove 35. As the work piece 20 moves longitudinally into further engagement with the hob 24, each successive hob tooth 32, being of increasing radius, cuts deeper into the work piece, until finally, when the end of the hob is reached at 26, the groove 35 has been cut completely into the surface of the work piece and it emerges as the rack shown at 21. As seen in FIG. 6, the root diameter 39 of the hob teeth is constant along the length of the hob 24, but the top diameter 40 steadily increases. Thus the root 39 of the hob thread forming the hob teeth lies on a cylinder centered on the hob axis, while the crest of the thread, forming the top diameter 40, lies on a cone also centered on the hob axis. The top of the tooth narrows to match the narrower width of the rack grooves 35, as the hob cuts deeper into the face of the work piece 20. Advance of the work piece 20 is synchronized with rotation of the hob 24, and at a rate dependent upon hob lead, which in turn is a function of helix angle H.

The envelope of the surfaces indicated at 40 lies on the surface of a cone. As seen in FIGS. 6 and 4, this conic surface has a constant, uniform semivertical angle e, being the angle between the conic elements and the axis of revolution of the cone.

By skewing the axis of the hob 24, with respect to the work piece axis, by the helix angle H, the teeth 22 in the resulting rack 21 will be perpendicular to the axis of the rack.

Figure 3:
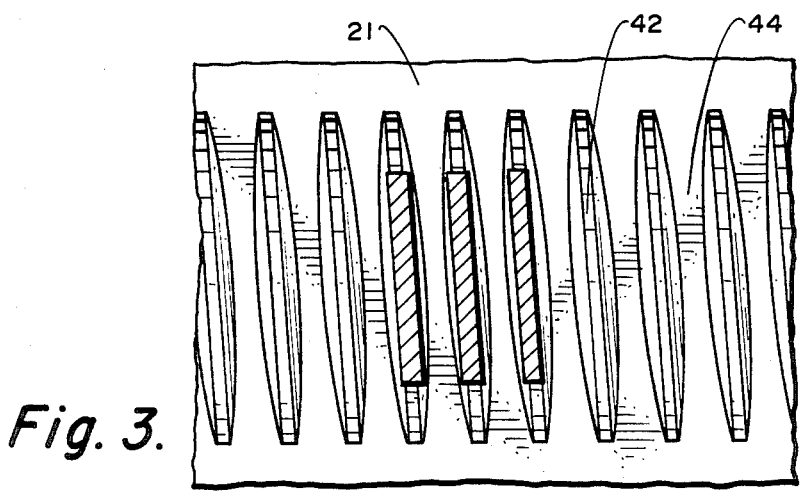
FIG. 3 is a section along line 3—3 in FIG. 2.

As seen in FIG. 5, each of the resulting rack teeth 22 has a concave recessed arcuate root 42. As seen in FIGS. 1, 3, and 4, the grooves or roots 42 do not extend all the way across the width of the face of the rack 21, but are recessed therein, stopping short of the side edges of the rack. This leaves a smooth track at the margin of the face at each side of the rack 21 on which may ride rollers mounted on the framework in which the pinion gear is journaled. The top 44 of the tooth is, in the present illustration, left flat, i.e. the surface of the box-like work piece 20 is left undisturbed. If desired, hob 24 could be construed so that, as the work proceeds, the tops 44 of the teeth in the rack would also be recessed.

Figure 7:
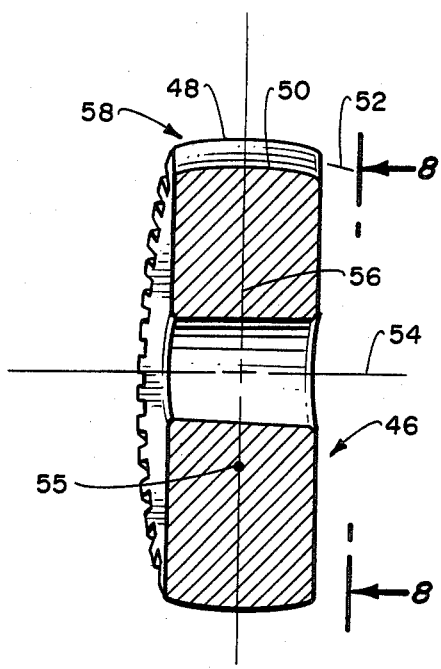
FIG. 7 is a sectional view of the helical gear shown in FIG. 1, taken on line 7—7 in FIG. 1.
Figure 8:
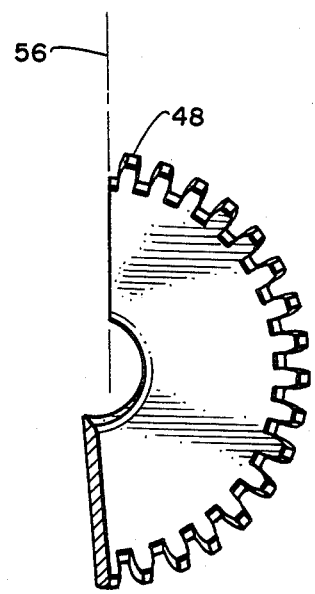
FIG. 8 is a side view taken along line 8—8 in FIG. 7.
Figure 9:
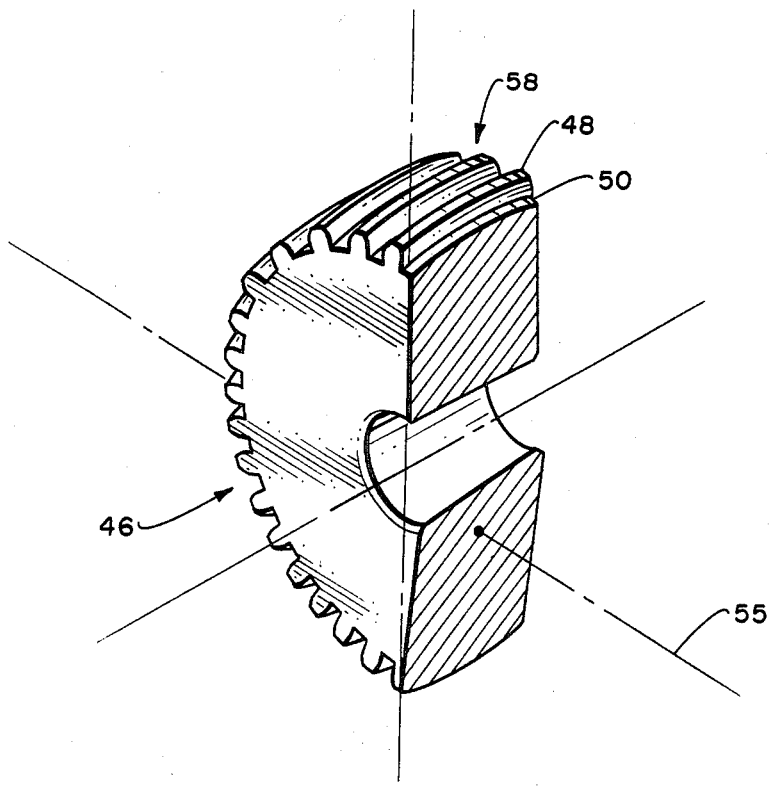
FIG. 9 is a perspective view of the sectioned gear shown in FIGS. 7 and 8.

The rack 21 mates with pinion gear 46, which has arcuate, helical teeth, the helix angle H of the gear 46 being the same as that of the rack 21. As shown in FIG. 7, each tooth of the gear 46 has its arcuate top 48, arcuate root 50, and arcuate locus of pitch points 52 positioned on.

Consequently the locus of pitch points across the face of each tooth, i.e., the pitch line, is also arcuate. Thus, the pinion tooth face possesses a convex curve transverse to its involute curve of the gear. As noted, this is also the helix of the rack 21. The axis 55 about which the respective arcs 48, 50 and 52 are struck intersects a diametral line 56 that bisects the gear tooth 58.

What is claimed is:

1. Rack having teeth formed in a substantially flat, elongate surface, by arcuate, recessed grooves, said grooves and the arc thereof extending across the width of the rack and lying on a helix formed about an axis parallel to the length of said elongate surface.

2. Rack in accordance with claim 1, wherein said grooves terminate short of the side edges of said surface, thus producing rack teeth which have a bridge at each end, co-planar with said surface and connecting to an adjacent tooth.

3. An arcuate helical gear or pinion, each tooth of which has its top, root, and pitch line positioned on respective arcs whose chords are tangent to the helix of the gear;

the axis of said arcs intersecting a diametral line of the gear that bisects the tooth.

4. Rack and pinion mechanism comprising:

a rack having teeth formed in a substantially flat, elongate surface, by arcuate, recessed grooves perpendicular to the length of said surface;

said rack being in meshing engagement with an arcuate helical gear or pinion, each tooth of which has its top, root, and pitch line positioned on respective arcs whose chords are tangent to the helix of the gear;

the axis of said arcs intersecting a diametral of line of the gear that bisects the tooth.

5. Rack and pinion mechanism comprising:

a rack having teeth formed in a substantially flat, elongate surface, by arcuate, recessed grooves which terminate short of the side edges of said surface, thus producing rack teeth which have a bridge at each end, co-planar with said surface and connecting to an adjacent tooth;

said rack being in meshing engagement with an arcuate helical gear or pinion, each tooth of which has its top, root, and pitch line positioned on respective arcs whose chords are tangent to the helix of the gear;

the axis of said arcs intersecting a diametral of line of the gear that bisects the tooth.

* * * * *